INVENTOR
PRENTICE ODOM
BY
ATTORNEY

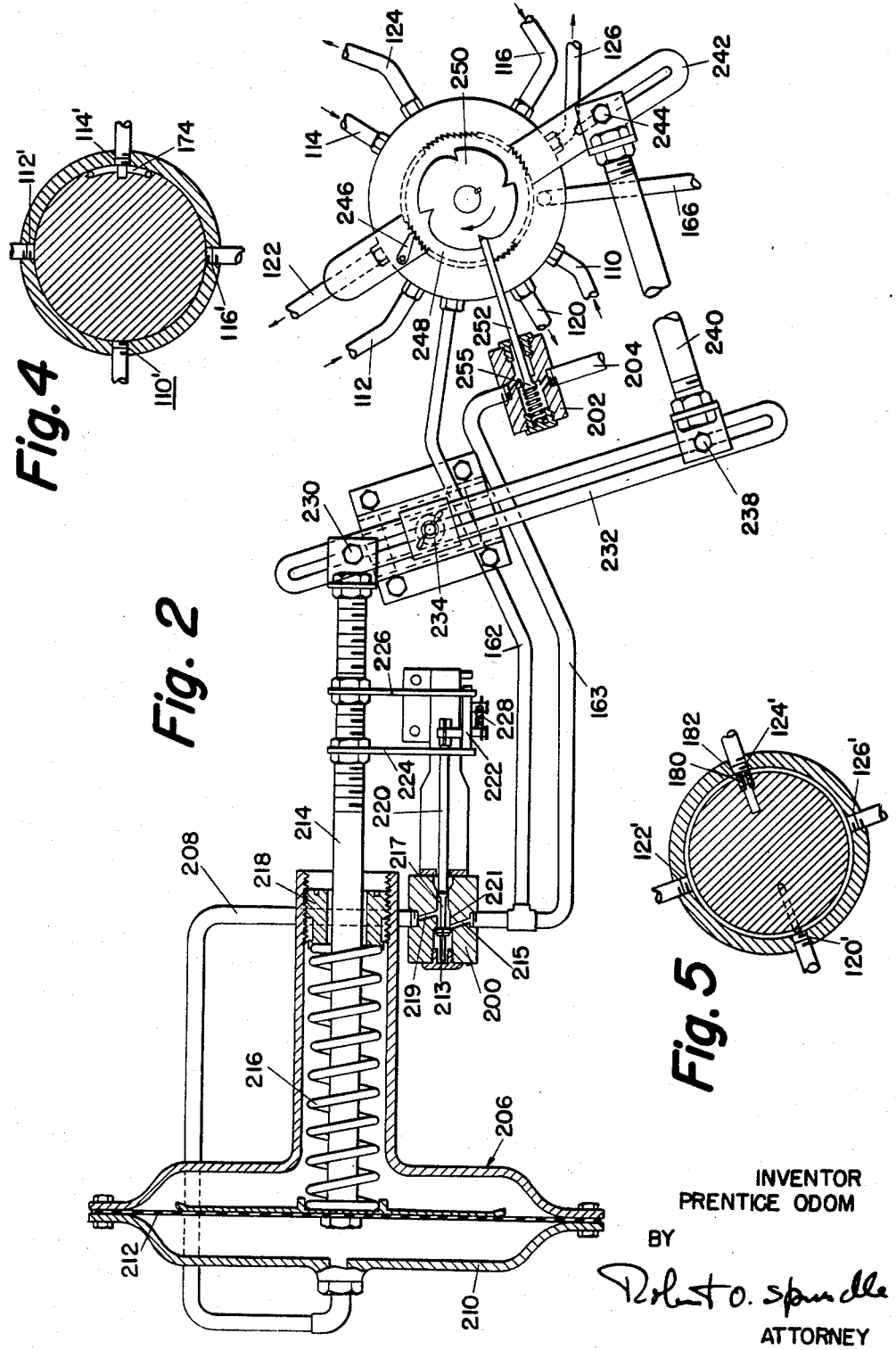

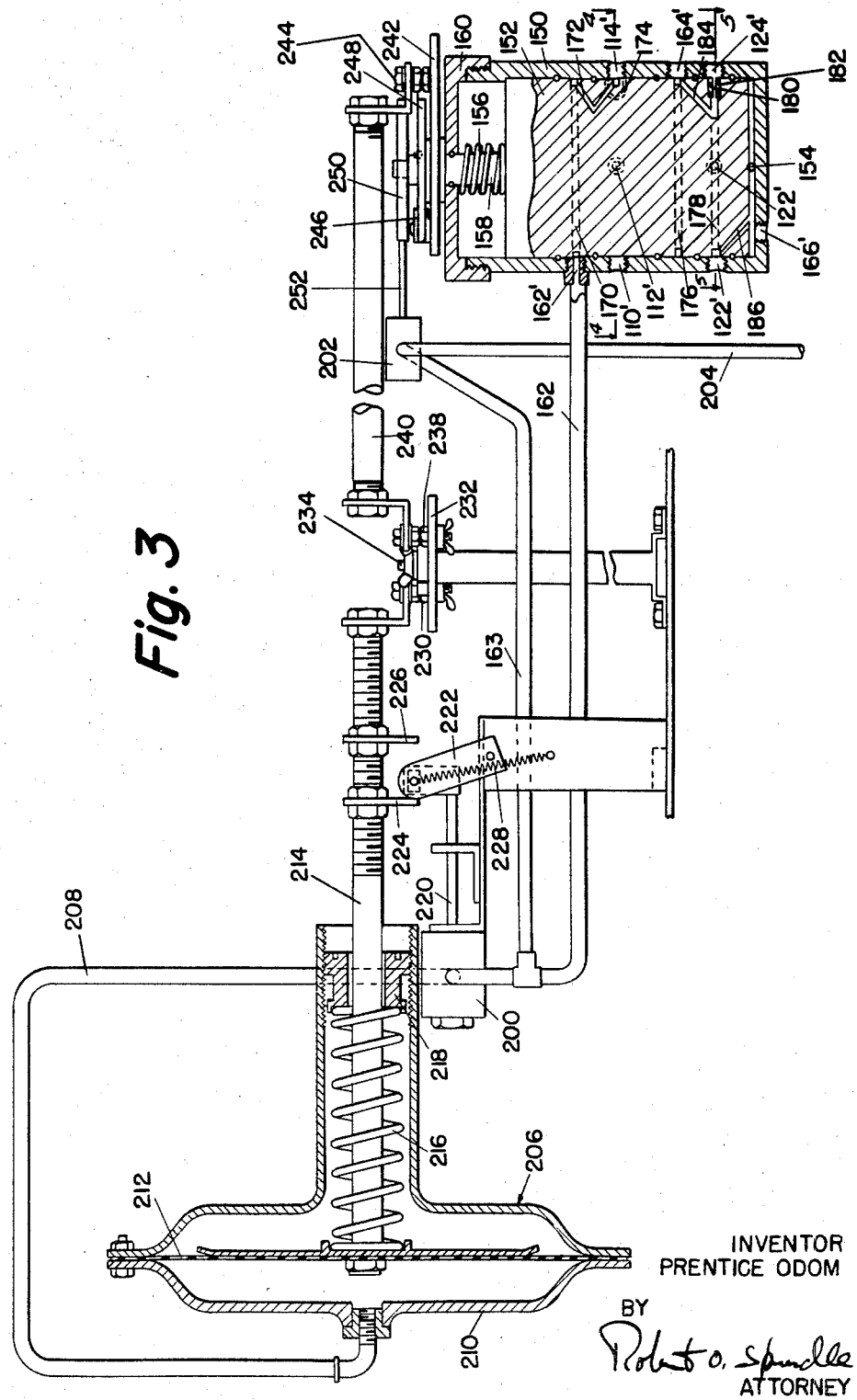

United States Patent Office
2,947,318
Patented Aug. 2, 1960

2,947,318

AUTOMATIC TANK SWITCHING SYSTEM

Prentice Odom, Winnie, Tex., assignor to Sun Oil Company, Philadelphia, Pa., a corporation of New Jersey Filed Aug. 26, 1957, Ser. No. 680,332

2 Claims. (Cl. 137—122)

The present invention relates in general to equipment used in controlling the production of petroleum, and more particularly to improvements in systems for measuring the production of crude petroleum at the source.

In producing crude petroleum, whether from an owned source or leased source, exact measurement of the quantities removed from the source must be made for accounting purposes. Normally, the gases and liquid are separated. After treatment to remove water and sediment from the liquid oil, it is pumped to storage tanks where it is accumulated over a period of from 3 to 7 days. This storage requirement is met with a varying number of different size tanks. There are usually at least two or more tanks forming a battery used for storage purposes, so that while oil is being discharged from one tank it is being fed into another.

Measurement of the quantities handled under such circumstances is made by an attendant at each separate location. For production-control purposes the volumes of oil, gas and salt water produced at each separate site are continuously measured over a twenty-four hour period. Whenever a full tank of oil is discharged to a pipe line, tank car or tank truck, the amount delivered is measured by gauging the height of the oil in the tank both before and after delivery is made. The gas constituent is metered as it is separated from the crude petroleum, and either shipped or stored. It is an object of the present invention to provide a storage system for the measurement of liquid petroleum at the producing source. A further object of this invention is to provide a storage system for measuring liquid petroleum, which automatically fills the storage tanks regardless of the sequence in which they are emptied.

The invention consists of a plurality of storage tanks positioned adjacent the source of crude petroleum. These storage tanks are connected in sequence to the petroleum source by a feed line and feed valves separately joining each tank to the supply. A gas separator is introduced into the feed line between the tanks and the petroleum source, to separate the liquid and gas constituents. A discharge line is positioned for connection to all the tanks by means of separate discharge valves.

The feed and discharge valves of each of the separate tanks are connected by means of a gas pressure circuit. Gas under pressure is introduced to these separate tank control circuits from a common gas supply line through a float controlled valve operated by the liquid as it is stored in and emptied from the tank. When full, the supply of more oil to the storage tank is prevented by the gas pressure condition released by the float-controlled valve. The full storage tank is discharged by manually opening the tank discharge valve.

Since all of the storage tanks are coupled to this feed-discharge valve arrangement, it is necessary to coordinate the filling and emptying operation of each tank with the others in the tank battery. This is achieved by means of a rotary, barrel-type valve positioned to connect all the feed-discharge valve circuits together for coordination. A supply of pressure gas is transmitted to this valve, and by means of coordinating the circuit pressure operation with a valve actuating means, the valve barrel is rotated to selectively control the refilling of the several tanks after they are emptied. In addition, by means of an interlocking valve arrangement between the feed-discharge valve circuits and the gas-pressure operating supply for the valve, the filling operation of the storage tanks, once accomplished, is controlled by completely closing down the operation and "shutting-in" the petroleum source, awaiting a discharge operation.

These and other objects will be evident from a reading of the following description of the system where reference is made to the accompanying drawings in which:

Figure 2 is a plan view of the rotary barrel-type pressure-operated control valve.

Figure 3 is an elevational view of the rotary control valve partly in section.

Figure 4 is a sectional view of part of Figure 3, taken on line 4—4.

Figure 5 is a sectional view of part of Figure 3, taken on line 5—5.

Figure 1:
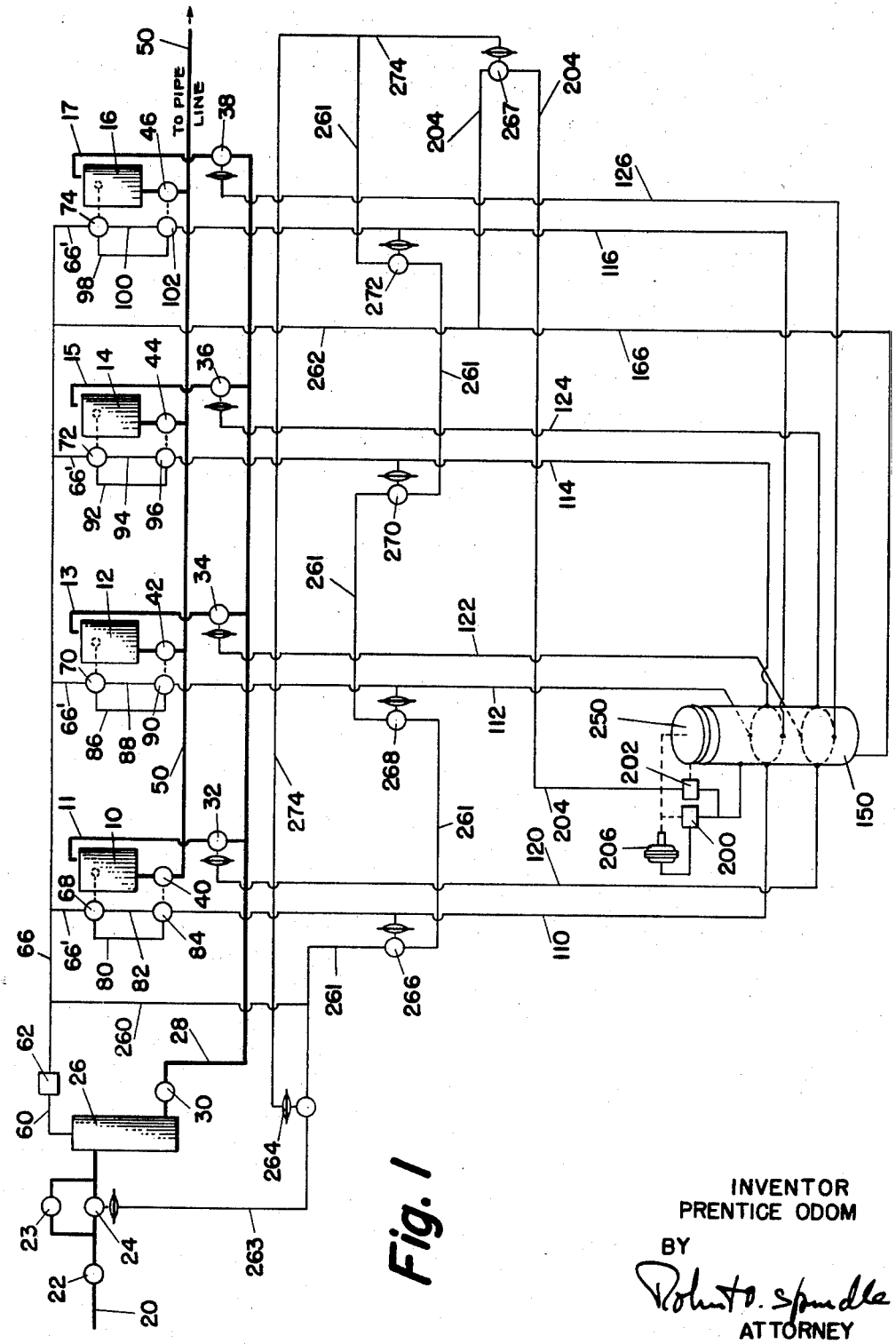
Figure 1 is a diagrammatic view of the complete automatic control system.

At present, the accounting procedure for production and sale of crude petroleum, as indicated above, involves the careful measurement of stored liquid volumes before and after the delivery operation. This entails the use of a gauging tape by the attendant and reference to tables prepared for each separate tank, to calculate the quantity which has been run off. A great amount of physical effort is entailed, and the possibility of error in both gauging and reading the volume tables is always present. The system to be described eliminates the repeated gauging of the old procedure by limiting the upper level of the stored liquid to a permanently established height and through interlocking means, requiring the run-off of each storage tank to continue to a predetermined low level. With the filling and draw-off levels established, volumes once calculated are always repeated. Then, as will be fully understood after reading the description of the detailed system and its operation, by automatically keeping the storage tanks always filled to the upper level and requiring manual manipulation for withdrawal and return to the refilling position, the gauging attendant is fully impressed with the volumes of crude petroleum or oil as it is termed here, which are dispensed.

In Figure 1, a diagrammatic representation of a preferred form of the system showing four storage tanks 10, 12, 14 and 16, is illustrated. As the description of the system proceeds, the selection of four storage tanks as shown will be understood to be arbitrary. A lesser number than four, but not less than two, or greater if desired, can be used. If the tanks were less than two in number, no such system as described here would be necessary. Consequently, two or more storage tanks, even or odd number, form the proper basis for the automatically responsive measuring system described here.

A source of crude petroleum (not shown) is connected by a pipe line 20 which is valved as by a pressure cut-off controller 22 and by a pressure opening diaphragm motor valve 24. A manually operable bypass valve 23 brackets valve 24, and is used solely to start the system, as is later described. The crude petroleum product is led to a gas liquid separator 26, where the separate components are divided. Pipe line 28 is the liquid feed line which transmits the oil to the storage tanks and is valved for manual control, if necessary, as at 30. Each storage tank, 10, 12, 14 and 16, is connected with the feed line 28 by a normally open pressure-closing diaphragm motor feed valve numbered 32, 34, 36 and 38, respectively. Feed lines 11, 13, 15 and 17 lead from these feed valves to the tanks, shown here to fill from the top. These feed valves are readily available on the market, as are all the valves used in the described system, with the exception of the rotary barrel-type valve later to be described in detail. Consequently, these known valves will not be described in detail, nor will they be specifically claimed. They will not be described or claimed, except as they form part of the control system of which they are a part.

Continuing with reference to Figure 1 and particularly to the storage tanks 10, 12, 14 and 16; these tanks are further separately connected by manually controlled discharge valves 40, 42, 44 and 46 to discharge line 50. Short drainage lines connect these discharge valves with the storage tanks at the bottoms, and lead into common discharge line 50.

The above description starting from separator 26 with feed line 28 and ending with discharge line 50 completes that part of the piping system, in conjunction with the storage tanks, which is devoted to handling the liquid constituent or oil of the crude petroleum. It remains to describe the gas-pressure control system involving the operation of the liquid feed valves described above, and the coordinating rotary valve which operates all the feed valve pressure circuits, in addition to the interlocking valve elements, thus controlling the flow of crude petroleum from the source.

The gas component of the crude petroleum separated in separator 26 is led out of the top of the separator, as by conduit 60. Reducing regulator 62, set for approximately 30 lbs. pressure, delivers the operating pressured gas to pressure line or conduit 66. Pressure line 66 passes above the storage tanks and is connected by short spur lines 66' to float control valves of the snap pilot type 68, 70, 72 and 74, for storage tanks 10, 12, 14 and 16, respectively.

From each of the float control valves, two pressure conducting lines extend downwardly to engage a three-way manually operated valve, this latter valve mechanically connected to operate in unison with the discharge valve. Thus, on storage tank 10, pressure lines 80 and 82 lead from float valve 68 to engage the three-way manually operated valve 84, indicated as mechanically connected for operating purposes with discharge valve 40. In like manner, pressure lines 86 and 88 connect with three-way valve 90, which is mechanically connected to discharge valve 42 on tank 12. Pressure lines 92 and 94 connect with three-way valve 96, which has a mechanical connection to valve 44 on tank 14. Pressure lines 98 and 100 connect with three-way valve 102, which has a mechanical connection to valve 46 on tank 16.

Each of the three-way valves 84, 90, 96 and 102 has connected to its third outlet a pressure line or conduit, respectively numbered 110, 112, 114 and 116, each of which forms a part of the gas pressure circuit ultimately connected to the feed valves respectively coupled to each of the separate storage tanks, through a rotary barrel type control valve 150.

Before describing this rotary control valve and its operating elements, the pressure circuit partially described above will be completed as though the rotary valve did not interrupt it. Thus, for each tank the pressure conducting lines 110, 112, 114 and 116 leading from the three-way valves 84, 90, 96 and 102, respectively, are returned to feed valves 32, 34, 36 and 38, respectively, by conduits 120, 122, 124 and 126. The pressure circuit connecting the discharge valve 40 (which cooperatively engages the three-way pressure control valve 84) and the feed valve 32 on tank 10, is formed by pressure conduit 110 as it is linked to conduit 120 by a particular position of the rotary valve, later to be described. In this way, similar pressure circuits are formed by joining conduits 112 and 122 for tank 12; conduits 114 and 124 for tank 14, and conduits 116 and 126 for tank 16.

The rotary barrel-type control valve referred to generally above, and indicated as the means by which the several pressure circuits for the respective storage tanks are controlled, is shown in several views in Figures 2 to 5, inclusive. In Figure 1, its position relative to the other elements of the measuring device is illustrated in perspective view. The fixed connections of the various pressure circuits previously described, together with other connections for delivering the operating gas pressure to the rotary valve itself, are shown. Also, the barrel rotating elements and safety device are easily seen. These elements as they are described will be numbered in all the figures, to make clear this valve's function in relation to the pressure circuits of the discharge and feed valves on the separate storage tanks.

Referring in particular to Figure 3, the casing 150 in which the rotatable barrel 152 is mounted, is clearly shown. For ease of operation and facility of placing the necessary sealing elements, the casing and the barrel are positioned concentrically relative to each other. A simple ball bearing support 154 reduces bottom friction between barrel and casing, and a compression spring 156 embracing a central shaft extension 158 of the barrel 152 holds this rotating element in operating position. Shaft 158 projects upwardly through casing cap 160 into engagement with the operating elements. As shown, the bottom of the casing 150 forms an integral part with the walls, but may be a separate closure similar in construction to cap 160, if desired.

The wall of the cylindrical casing 150 is apertured for connection to pressure conduits at two levels. These connections, which can well be named ports because of their nature and the type of valve operation coupled with their purpose, will be numbered in accordance with the previously established numbers of the pressure conduits leading to and from them, by using the prime of the conduit number. The ports in the upper level are adapted to receive the pressure conduits from the three-way valves, and are numbered to correspond with those conduits by their primes 110', 112', 114', and 116'. Connected at a lower level and conducting pressure to the several feed valves, thus completing the gas pressure circuit, the pressure conduits 120, 122, 124 and 126 are connected. These lower ports are numbered as indicated above, 120', 122', 124' and 126'. These ports are numbered in Figures 2, 3, 4 and 5 and are indicated by their connected conduits in Figure 1.

It will be understood, after reading the description of the operation of the system later in the specification, that a definite operating relation between the ports and connected pressure conduits is required. In the sectional view of the casing as shown in Figure 3, the ports for cooperating pressure conduits are vertically aligned in the casing. Such an arrangement emphasizes the necessity for a cooperating arrangement but it is believed evident that it need not be adhered to too strictly. Any cooperating arrangement will suffice.

Further study of Figure 3 shows three additional ports, yet unnumbered, in casing 150. These ports will be given primed numbers, in conformity with other port designations, and any conduits connected to them will carry that number without the prime. Thus, at a point spaced above the upper level of port 110', etc., in the casing and in line with port 110', port 162' is provided to be connected with the rotary valve operating elements. Diametrically opposite in the casing and spaced above the lower level of ports 120', etc. and directly above port 124', port 164' is provided as a vent to atmosphere. Finally, in the bottom of the casing, port 166' is provided for connection to a gas pressure supply conduit, to serve the needed operating pressure to the feed valves connected to the tanks, thus completing the pressure circuit.

Before describing the rotating mechanism and tracing the supply of pressured gas necessary for the rotary valve operation, the structure of the rotary valve barrel 152, as it is related to the ports in the casing, will be disclosed.

In Figure 3, a sectional view of barrel 152, with grooves for transfer of pressured gas, connecting passages between the grooves and selected ports, and a plurality of O rings sealing the receiving or transmitting levels from each other, are fully shown.

In alignment with casing port 162', a groove 170 circles rotary barrel 152. Diametrically opposite ports 162' and 110' and in line with port 114' passage 172 is drilled to connect groove 170 with port 114'. A seal ring 174 is fitted to the face of the barrel forming an inner port which makes sealing contact with any one of the ports 110', 112', 114' or 116' which it is aligned to engage. Thus, contact with these ports will transfer the pressure condition existing in the attached conduit through passage 172 to groove 170 therein to port 162' and to any conduit connected thereto. In continuation with port 164' which vents to atmosphere, groove 176 encircles barrel 152. Groove 178 connects ports 120', 122', 124' and 126' transferring therebetween any pressure condition from connected ports. Within the barrel 152, however, an internal port 180 aligned for pressure transfer engagement with all the casing ports at the lower level, is fitted with a resilient bushing 182 made of rubber, neoprene or the like, which engages only the port with which it is in contact, shutting off communication to groove 178 and the other ports opening thereon. An internal passage 184 connects internal port 180 with groove 176 which, of course, vents the pressure condition of the casing port engaged, to atmosphere. Diametrically opposite to passage 184 and connecting groove 178 to the space at the bottom of the casing below the bearing-supported barrel, passage 186 is drilled. The pressure condition delivered to bottom casing port 166' is transferred through barrel passage 186 to groove 178, and except for barrel port 180 and the casing port then engaged thereby, is transferred to all other ports of the lower level.

The elements coupled with the casing and rotary barrel of the above-described valve to actuate that valve are illustrated in Figures 1, 2 and 3. They will be numbered alike in all views. Starting with casing port 162' through which operating pressure from any of the pressure conduits 110, 112, 114, and 116 leading from the separate tanks to the rotary valve is delivered, pressure conduit 162 connected to port 162' transmits actuating pressure to pilot valve 200. Conduit 163 is connected to receive the same pressure existing in conduit 162 and pilot valve 200, and leads that pressure to a booster valve 202 which assists in completing the rotating movement. Gas supply conduit 204, to be later described, assists in operation of booster valve 202.

In pressure receiving connection with pilot valve 200, diaphragm motor valve 206 is designed to supply the valve rotating movement. From pilot valve 200, conduit 208 conducts gas pressure to the motor valve housing 210 behind the supported diaphragm 212. A plunger 214 reciprocates in response to the effect of the pressured gas on the diaphragm 212. Spring 216, abutting plug 218 secured into the motor valve housing, is compressed by the diaphragm movement and exerts opposing pressure. Pilot valve 200, through operation of piston 220 responding to the movement of plunger 214 as by the operation of lever 222 held in engagement with positioned plates 224 and 226 on the plunger by spring 228, periodically actuates the diaphragm in responding to gas pressure.

Adjustably and reciprocably connected to the end of plunger 214, as by pin 230, a slotted member 232 is pivotally supported as by pin 234. Being slotted, as shown, member 232 can be adjusted relative to plunger 214 and the pivotal support 234, giving a wide selection of cooperating lever arm relationships between the plunger, supporting pin and pin connection 238 which connects lever 240. The central shaft extension 158 of barrel 152 supports lever 242 freely reciprocable thereon and, in turn, slotted for variable leverage engagement with lever 240 as by pin 244. A pawl 246 engages rack 248, which when reciprocated by the described leverage in connection with the diaphragm motor valve, rotates barrel 152 into varied port engagement.

Fastened to the top of the central shaft extension 158, cam 250 is shaped to conform with the number of tanks in the battery. Without major change in the rotary valve as shown, it can be adapted to serve upwardly of twelve tanks, or reduced to operate two tanks, merely by changing cams. All the parts in the valve casing, adapted to conform with the desired operation, cooperate with the booster valve 202. A reciprocating plunger 252 is urged to compress spring 255 (Figure 2) by action of cam 250 as the rotary valve is moved in response to diaphragm valve 206 operation. Opening of the passage 255 between the chambers of booster valve 202 admits a supply of pressured gas from conduit 204 to conduit 163 and thence through pilot valve 200 (Figure 2) to boost the operation of diaphragm 212, thus assisting the rotation of the barrel 152 to a new position. Plunger 252 rides cam 250 and checks the barrel rotation at a port-conduit engaging position.

It remains to describe the conduit and valve arrangement used to transmit operating gas pressure to the rotary valve, and the means by which all the elements of the system are coordinated. Two pressure conduits 260 and 262 (Figure 1) are tapped into pressure conduit 66 previously described. Conduit 260 is divided into two branches, conduit 261 and conduit 263. Conduit 263, passing through the three-way pressure closing diaphragm motor valve 264, returns to control motor valve 24 which is maintained open by pressure until shut off by operation of valve 264. The other branch conduit 261 by-passes valve 264 and crosses the conduits in which pressure is created by operation of the tank discharge valves, namely, conduits 110, 112, 114 and 116. At each crossing point a pressure opening diaphragm motor valve is positioned to operate in response to pressures in the above-numbered conduits. These valves are numbered 266, 268, 270 and 272 and are shown in proper operating position in Figure 1. Thus, conduit 261 is divided into sections between these valves and terminates in connection with conduit 274. Conduit 274 returns in one direction to terminate in the diaphragm element of valve 264 and in the other direction ends in the diaphragm element of another pressure closing diaphragm motor valve 267.

Returning to pressure conduit 262 which taps into conduit 66 between storage tanks 14 and 16, this conduit transmits pressure to a branch where it splits into conduits 166 and 204. As conduit 166 it transmits pressure to port 166' in the bottom of casing 150 of the rotary valve (Figure 3). And as conduit 204 it passes through the valve portion of valve 267 and supplies pressured gas to booster valve 202 to assist in actuating the rotation of barrel 152 (Figure 2).

The description of the operation of the above detailed system must, to be complete, cover a sufficient number of filling and emptying situations to demonstrate the flexibility and advantages of the mechanism. Consequently, the related operations and functions of the different valves and the cooperating rotary barrel-like valve will be discussed in different degrees of complexity. A general filling of the system, as it would occur after installation of the system or bringing in a well, will be first described, then valve responses will be detailed, assuming one or more of the tanks in different sequences to be emptied and refilled. Such discussion of these representative operations will disclose the versatility and efficient operation of the system under all conditions.

When initially operated, or after a prolonged "shut-in" period, there is no pressure or insufficient pressure for valve operation in the conduit system. Consequently control valve 24, which is normally biased to a closed position needing pressure to open it, will not open to pass the crude material to the separator for the first supply of pressure gas without assistance. By-pass valve 23, manually operated, provides this assistance. Once the pressure gas fills the system, particularly conduits 60, 260 and 263 through valve 264 normally biased open and requiring pressure to close it, pressure operated valve 24 will be held open to pass the crude petroleum to the separator 26 at the beginning of the system. Conduits 261 as far as valve 266 which is biased to the closed position, and 66 are also filled with the pressuring gas on this initial surge.

In filling conduit 66, the gas at selected pressure is transmitted into operating engagement with float valves 68, 70, 72 and 74 on tanks 10, 12, 14 and 16, respectively, and also through conduits 80, 86, 92 and 98 on these tanks to become operative against valves 84, 90, 96 and 102. Continuing to trace the flow of the pressure gas as it filters through the system until stopped, conduit 262 transfers the gas to conduits 204 and 166, which split from 262 as shown.

The above trace of the flow of pressure gas as it initially enters the system can, up to this point, be followed on Figure 1. For the following description, all the figures of the drawing are suggested for reference, as the details of the contacted elements are clearer in some views than in others.

Conduit 166 delivers the operating pressure gas to casing port 166' and thence to groove 178 in the barrel 152 of the rotary valve. From groove 178 the gas, depending on the rotated position of the barrel, enters three of the four connected conduits 120, 122, 124 and 126, not entering the one of these which is covered by barrel port 180, which is shown in Figure 3 as connecting with casing port 124' coupled with conduit 124 associated with feed valve 36 on tank 14.

Before considering the effect of the pressure condition developed and described above, the supply of pressure gas delivered to conduit 204 will be traced. In this way, the effects of all pressure imposed on the rotary valve will be completed, and the description can be followed from there. The gas in conduit 204 passes through valve 267 which is biased open requiring pressure to close it, and continues to the rotary valve (Figure 1) where it enters the booster valve 202. It is stopped there, awaiting rotation of the valve.

Returning to consider the pressure in conduits 120, 122 and 126 (conduit 124 being positioned to vent to atmosphere through passageway 184, groove 176 and casing port 164'), the associated feed valves 32, 34 and 38 are pressure closed. Feed valve 36, on which there is no pressure, and which like all these feed valves is normally biased open requiring pressure to shut them, permits its associated tank 14 to fill from line 28. This tank will continue to fill, valve 24 being held open by gas pressure in conduit 263. Valve 264 is biased open, no pressure being available in conduit 261 for transmission to conduit 274 to close it. Relative to the passage of pressure gas through conduit 261 in its several lengths between valves 266, 268, 270 and 272, it is noteworthy that these last-numbered valves are biased closed, requiring pressure to open them. Further, when pressure is released from these valves they are designed to bleed pressure from that portion of conduit 261 between the released valve and the next valve in sequence of the higher number. Hence, conduit 274 does not receive sufficient pressure from conduit 261 to close valve 264, thereby shutting down the system when it is completely filled. This operation is described later. Tank 14 is now filling, feed valve 36 being open.

Tank 14 is selected to demonstrate the feasibility of starting the filling operation in one of the interior tanks of the series, rather than the end tank. It is assumed now to be filled. In later description of other filling and emptying tank relationships, it will be understood that any tank could be used for first filling, and that tank 14 was chosen arbitrarily. As the liquid reaches the top of tank 14, float valve 72 opens, transmitting pressure gas through conduit 94 and through valve 96 to conduit 114. Valve 270 receives pressure, opening to connect the length of conduit 261 between valves 268 and 270 with that portion of the same conduit between valves 270 and 272. However, as valves 266 and 268 are still biased to the closed position, no pressure yet being admitted to conduits 110 and 112, tanks 10 and 12 being empty, there is no gas to pass through open valve 270. If gas under pressure were passed to the section under consideration, it would be stopped by valve 272, as there is no gas pressure in conduit 116, which is necessary to open valve 272.

The passage of pressure gas through conduit 114, in addition to opening valve 270, enters port 114' in casing 150 (Figure 3), travels through barrel passage 172 to groove 170 and into conduit 162 through port 162'. Now, the operating pressures for rotation of the rotary valve are in the actuating position. Referring to Figure 2, pressure is in conduit 204, awaiting the action of the booster valve 202. Also, pressure is being passed through pilot valve 200, piston 220 holding valve 217 at the extreme end of the stroke, with diaphragm 212 at rest. In this position, ports 215 and 219 are connected through central chamber 221, operating pressure from conduit 162 then being delivered to conduit 208 to press diaphragm 212 to the right. Shaft 214 moves, compressing spring 216 and throwing eccentric lever 222 to the right. On the shaft's reaching full stroke in that direction, lever 22 is held in the extreme right position by spring 228. Port 215 is closed to port 219 by this movement, while port 219 is opened to atmosphere, allowing diaphragm 212 to return to the normal position.

With the movement of shaft 214 and the resultant response of the pilot valve 200 as described above, lever 232 is operated, rotating the barrel of the rotary valve through one position as determined by port spacing, in a clockwise direction. The amplified lever action is concentrated in the pawl 246 and rack 248 elements, which rotate the barrel on the pressure stroke of the diaphragm. On the return of the diaphragm to the inactive position caused by the expansion of spring 216, pawl 246 slides on rack 248 to assume a new operating position such as to be later responsive to another pressure impulse.

As the barrel of the rotary valve is rotated by the pawl and rack operation, cam 250 urges piston 252 into the booster valve 202, opening the valve passage, compressing spring 255 and transmitting gas pressure from conduit 204 to conduit 163, thence to pilot valve 200 central chamber 221 (Figure 2). Valve 213 moves to the right as described above, closing port 215 and opening port 219 to atmosphere, allowing diaphragm 212 to return to normal position. Barrel 152 (Figure 3) is urged to complete the rotary motion of the predetermined segment of movement between ports, pushing the cam 250 around until spring pressed lever 252 drops into the next successive notch. This anchors the cam and barrel, aligning the next series of ports with the necessary transmitting barrel openings, grooves and passages.

The expansion of spring 216, no longer opposed by gas pressure as the pilot valve, the booster element and the rotary valve are not in pressure transmitting cooperation, returns the diaphragm 212 to the inactive position, and restores the initial position of the pilot valve 200, which bleeds out the pressures in conduits 162, 163 and 208. As the barrel of the rotary valve rotates to the next position, the effect on either the feed valve of the successive tank or on the diaphragm 212 of the rotary valve operating pressure motor depends upon the pressure condition met by the barrel transmitting ports 174 in the upper port level and 180 in the lower port level. If pressure is met, meaning that the tank coupled to the circuit of conduits connecting the feed and discharge valves is full, the barrel will be repeatedly rotated until the next empty tank, with the attendant lack of pressure in the valve circuit, is encountered. Before describing the portion of the system which shuts down the operation should all tanks be filled, the description of successive operation started above with tank 14, will be continued, starting with the complete filling of that tank and the rotation of the rotary valve to the next successive tank, number 16, where filling is required.

With a large part of the operation understood from the detailed description above, and the example presently under discussion assuming an initial use of the system 10 with only tank 14 now filled, the following discussion, it is believed, can be shortened. The rotary valve, actuated as above described, rotates to connect the rotary valve barrel passages 172 and 184 with conduits 116 and 126, completing the feed-discharge valve circuit for tank 16. This tank is empty; therefore, the gas pressure for the attendant valve circuit is stopped at the float valve 74 and three-way valve 102 which is mechanically connected for cooperating response with discharge valve 46. There is, consequently, no pressure in conduit 116. There is pressure, however, in conduit 126, which holds feed valve 38 closed, this valve normally biased to the open position without pressure.

As the rotary valve barrel 152 is rotated to the next port position in sequence, no pressure present in conduit 116, the valve is stopped and held by the shaft and cam arrangement previously described. The pressure in conduit 126 is released through passage 184 in the rotary valve barrel, and vents to atmosphere through casing port 164' (Figure 3). Feed valve 38, now relieved of pressure which held it closed, assumes the normally open position, which is that of feeding the liquid in until the tank is full. At that point, the float valve 74 operates, passing pressure gas around the three-way valve as above explained, to fill conduit 116 and excite the rotary valve to move to the next position in sequence, until there is no pressure transmitted to actuate the valve barrel.

In the sequential operation of this example, the next tank requiring filling is number 10. After tank 10 is filled, the rotary valve is actuated by the internal pressure condition explained above, to move to tank 12, with the resultant filling operation. At this point in our example all the tanks are filled and it is necessary to consider the part of the system, cooperating with elements already described, which shuts down the operation. It will be understood that without such a complementary shut-down means, it is possible that the rotary valve would continue to rotate, impelled from port to port sequence by the existence of gas pressure in all the conduits connected to the upper level valve operating ports.

Such continuous, profitless rotation is eliminated by the use of valves 266, 268, 270 and 272, which divide conduit 261 into connecting sections. These valves are operably connected to the conduits which transmit actuating pressure to the rotary valve, namely 110, 112, 114 and 116, respectively. These valves have been described above as normally biased to the closed position, requiring pressure to open them. In the problem described above, valve 270 is the first of these valves opened, as tank 14 is the first filled, and the actuating pressure released through conduit 114 to switch the pressure connections to the feed-discharge valve circuit of tank 16. Thus, in sequence valves 272, 266, and 268 are opened. Conduit 261 is then open across all the intersecting circuits, and pressure is delivered to valve 267. This valve is normally biased open, as is also valve 264. Pressure delivered through conduit 274 from conduit 261 to both these valves closes them and shuts down the operating pressures.

First, the closure of valve 267 closes the supply of pressure gas to booster valve 202 through conduit 204. In consequence, the impulse which spurs the barrel of the rotary valve into its new locked position is lacking. But of greater importance is the closure of valve 264, noted above as the second result. Valve 24, the basic control valve, is normally biased to the closed position, requiring a constant supply of gas pressure to hold it open. Hence, the closure of valve 264 deprives valve 24 of the necessary pressure and shuts in the well. No gas pressure is then available for conduit 66, 262 and 166 for continued operation. A static pressure condition is established throughout the system, all storage tanks being filled.

From the above filled and "shut-in" condition, which is assumed automatically by the pressure controlled system described, any one of the tanks may be discharged of its contents without regard to its position in the tank battery, and it will automatically be filled. The rotary valve will be rotated by pressured impulses until finally the valve barrel is associated with the pressure conduit in which there is no pressure. At this point, the valve has sensed the empty tank, and the filling procedure will follow as described. If the tanks are emptied either in sequence or at random, the rotary valve will fill one and then proceed to fill the next which sequentially requires filling. Should the entire battery be emptied, the rotary valve will have been busy filling the first one empty which it encounters.

Normal emptying of a tank in which a measured volume of liquid is stored, controlled by the float valve position and the position of the discharge valve, is done by means of manual operation of the discharge valve. The three-way valve and the discharge valve on each tank have been described as mechanically linked together. As the discharge valve is operated to the open or discharging position, the three-way valve is shifted to connect the second of the two gas pressure lines connected to the gas source conduit, thus keeping gas pressure in the pressure conduit from tank to rotary valve. This pressure in the pressure conduit holds the associated valve cooperating with conduit 261 open until the tank is empty and the discharge valve closed. When the discharge valve is closed, the three-way valve bleeds the pressure from the pressure conduit to atmosphere, allowing the valve intercepting conduit 261 to close and, in turn, bleed off the pressure which is holding valves 264 and 267 closed. Pressure is then transmitted to valve 24 and the system is again pressured and ready for operation. The emptied tank or tanks is refilled and the operation repeats as above described.

In summary, the gas constituent of the crude petroleum operates the storage and control of the liquid constituent. This is done automatically in measured quantities, by a system of conduit connected valves. The control is a barrel-type rotary valve, in which the feed-discharge valve pressure cooperating circuits, one for each storage tank, are centered. Each circuit is separate, not connected to any other. The rotary valve places the circuits sequentially in operating connection. In each circuit, pressure is conducted from the area of the storage tank, initiated by either the condition of the tank, empty or full, or by operation of the discharge valve to the open or closed position, to actuate the rotary valve. Response to the actuating pressure condition affects the feed valve, depending on whether the tank is full or empty. Although the several circuits are maintained separate from each other by means of valves in each, responsive to pressure conditions therein, the actuation of the rotary valve and the delivery of pressure gas from the well to operate the system are cooperatively controlled. Thus, all circuits are enabled to participate in operation of the system, yet be individual in the storage and discharge operation.

I claim:

1. An automatic pneumatically-operated system for storing crude petroleum for subsequent controlled delivery comprising means for receiving the crude petroleum and for separating the same into liquids and gases, a plurality of storage tanks, a feed line carrying the liquids from said separating means through valved connections to each of the tanks, a conduit system conducting gas at operating pressure from said separating means to the valve means controlling the feed line connections, a single valve connected in said conduit system for selectively directing gas pressure in operating force to the feed line connection valve means on the separate tanks, the operating position of said single valve, and thereby also of the various feed line connection valve means, being controllable in response to gas pressure supplied to said single valve; a float-controlled valve on each tank connected to control a separate valve-positioning supply of pressured gas fed from said separating means to said single valve, a plurality of control valves equal in number to the number of storage tanks, each control valve being responsive to the pressure conditions existing in the connection from a respective float-controlled valve to said single valve and each control valve being operated to a predetermined position when its respective storage tank is filled; and means operating in response to the reaching by all of said control valves of said predetermined position, to disable said single valve so as to prevent needless rotation thereof.

2. An automatic pneumatically-operated system for storing crude petroleum for subsequent controlled delivery comprising a flow line adapted to be coupled to a source of crude petroleum and having a cut-off valve therein; a gas-liquid separator coupled to said flow line, a plurality of storage tanks, a feed line carrying the liquids from said separator through valved connections to each of the tanks, a conduit system conducting gas at operating pressure from said separator to the valve means controlling the feed line connections, a single valve connected in said conduit system for selectively directing gas pressure in operating force to the feed line connection valve means on the separate tanks, the operating position of said single valve, and thereby also of the various feed line connection valve means, being controllable in response to gas pressure supplied to said single valve; a float-controlled valve on each tank connected to control a separate valve-positioning supply of pressured gas fed from said separator to said single valve, a plurality of control valves equal in number to the number of storage tanks, each control valve being responsive to the pressure conditions existing in the connection from a respective float-controlled valve to said single valve and each control valve being operated to a predetermined position when its respective storage tank is filled; and means operating in response to the reaching by all of said control valves of said predetermined position, to operate said cut-off valve to thereby cut off the supply of crude petroleum to said separator.

References Cited in the file of this patent
UNITED STATES PATENTS

| | | |
|---|---|---|
| 2,605,780 | Nance | Aug. 5, 1952 |
| 2,700,984 | Gleasman | Feb. 1, 1955 |
| 2,741,265 | Poor | Apr. 10, 1956 |
| 2,792,012 | Howard | May 14, 1957 |
| 2,800,138 | Peters et al. | July 23, 1957 |
| 2,810,392 | Brown | Oct. 22, 1957 |
| 2,821,998 | Mayhew | Feb. 4, 1958 |
| 2,824,569 | Wright | Feb. 25, 1958 |
| 2,869,676 | Lagucki | Jan. 20, 1959 |